(12) United States Patent
Purang et al.

(10) Patent No.: US 8,050,949 B2
(45) Date of Patent: *Nov. 1, 2011

(54) METHOD AND APPARATUS FOR AN ITINERARY PLANNER

(75) Inventors: Khemdut Purang, San Jose, CA (US); Mark Earl Plutowski, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/004,766

(22) Filed: Jan. 11, 2011

(65) Prior Publication Data

US 2011/0161271 A1 Jun. 30, 2011

Related U.S. Application Data

(62) Division of application No. 10/740,143, filed on Dec. 17, 2003, now Pat. No. 7,895,065.

(60) Provisional application No. 60/451,116, filed on Feb. 26, 2003.

(51) Int. Cl.
*G06Q 10/00* (2006.01)

(52) U.S. Cl. .............................. 705/5; 705/6

(58) Field of Classification Search .................. 705/5–6
See application file for complete search history.

(56) References Cited

U.S. PATENT DOCUMENTS

| | | |
|---|---|---|
| 4,608,656 A | 8/1986 | Tanaka et al. |
| 5,115,398 A | 5/1992 | De Jong |
| 5,161,886 A | 11/1992 | De Jong et al. |
| 5,255,349 A | 10/1993 | Thakoor et al. |
| 5,272,638 A | 12/1993 | Martin et al. |
| 5,274,742 A | 12/1993 | Morita et al. |
| 5,359,529 A | 10/1994 | Snider |
| 5,444,965 A | 8/1995 | Colens |
| 5,467,268 A | 11/1995 | Sisley et al. |
| 5,557,522 A | 9/1996 | Nakayama et al. |
| 5,559,707 A | 9/1996 | DeLorme et al. |
| 5,613,055 A | 3/1997 | Shimoura et al. |
| 5,623,580 A | 4/1997 | Inoue et al. |
| 5,629,854 A | 5/1997 | Schulte |
| 5,636,125 A | 6/1997 | Rostoker et al. |
| 5,640,490 A | 6/1997 | Hansen et al. |
| 5,640,559 A | 6/1997 | Silberbauer et al. |

(Continued)

FOREIGN PATENT DOCUMENTS

EP 0 932 134 7/1999

(Continued)

OTHER PUBLICATIONS

"How MapQuest Gets You From Here to There," from http://www.findarticles.com, Nov. 2003.

(Continued)

*Primary Examiner* — John Hayes
*Assistant Examiner* — Tonya Joseph
(74) *Attorney, Agent, or Firm* — Blakely, Sokoloff, Taylor & Zafman LLP

(57) ABSTRACT

A method and apparatus for providing an itinerary planner is described. The itinerary planner generates itineraries for visiting locations which are personalized to the user's preferences. Unknown conditions are handled by contingency plans that the itinerary planner generates in an anytime manner. The first itineraries are derived in a short time, and as more computation time is allowed, additional itineraries that better suit the preferences of the user are obtained.

29 Claims, 11 Drawing Sheets

U.S. PATENT DOCUMENTS

| | | | |
|---|---|---|---|
| 5,642,519 | A | 6/1997 | Martin |
| 5,644,656 | A | 7/1997 | Akra et al. |
| 5,647,048 | A | 7/1997 | Ting et al. |
| 5,652,890 | A | 7/1997 | Foster et al. |
| 5,659,555 | A | 8/1997 | Lee et al. |
| 5,677,956 | A | 10/1997 | Lafe |
| 5,680,552 | A | 10/1997 | Netravali et al. |
| 5,682,322 | A | 10/1997 | Boyle et al. |
| 5,684,898 | A | 11/1997 | Brady et al. |
| 5,694,488 | A | 12/1997 | Hartmann |
| 5,696,962 | A | 12/1997 | Kupiec |
| 5,706,400 | A | 1/1998 | Omlin et al. |
| 5,708,829 | A | 1/1998 | Kadashevich et al. |
| 5,737,403 | A | 4/1998 | Zave |
| 5,737,609 | A | 4/1998 | Reed et al. |
| 5,845,228 | A | 12/1998 | Uekawa et al. |
| 5,890,088 | A | 3/1999 | Nimura et al. |
| 5,897,629 | A | 4/1999 | Shinagawa et al. |
| 5,948,040 | A | 9/1999 | DeLorme et al. |
| 5,961,571 | A | 10/1999 | Gorr et al. |
| 6,003,015 | A | 12/1999 | Kang et al. |
| 6,014,518 | A | 1/2000 | Steensgaard |
| 6,041,281 | A | 3/2000 | Nimura et al. |
| 6,047,280 | A | 4/2000 | Ashby et al. |
| 6,121,900 | A | 9/2000 | Takishita |
| 6,128,571 | A | 10/2000 | Ito et al. |
| 6,128,574 | A | 10/2000 | Diekans |
| 6,148,090 | A | 11/2000 | Narioka |
| 6,163,749 | A | 12/2000 | McDonough et al. |
| 6,178,377 | B1 | 1/2001 | Ishihara et al. |
| 6,317,685 | B1 | 11/2001 | Kozak |
| 6,341,267 | B1 | 1/2002 | Taub |
| 6,477,520 | B1 | 11/2002 | Malaviya et al. |
| 6,490,566 | B1 | 12/2002 | Schmidt |
| 6,510,383 | B1 | 1/2003 | Jones |
| 6,567,746 | B2 | 5/2003 | Kuroda et al. |
| 6,611,738 | B2 | 8/2003 | Ruffner |
| 6,622,084 | B2 | 9/2003 | Cardno et al. |
| 6,636,840 | B1 | 10/2003 | Goray et al. |
| 6,662,105 | B1 | 12/2003 | Tada et al. |
| 6,678,750 | B2 | 1/2004 | Meade et al. |
| 6,789,102 | B2 | 9/2004 | Gotou et al. |
| 6,937,936 | B2 | 8/2005 | Nimura |
| 7,239,962 | B2 | 7/2007 | Plutowski et al. |
| 2001/0037229 | A1 | 11/2001 | Jacobs et al. |
| 2001/0047287 | A1 | 11/2001 | Jacobs et al. |
| 2002/0055865 | A1 | 5/2002 | Hammann |
| 2002/0174021 | A1 | 11/2002 | Chu et al. |
| 2003/0144934 | A1 | 7/2003 | Totten |
| 2004/0205394 | A1 | 10/2004 | Plutowski |

FOREIGN PATENT DOCUMENTS

| | | |
|---|---|---|
| JP | 63-64508 | 3/1988 |
| JP | 01-237265 | 9/1989 |
| JP | 5-46590 | 2/1993 |
| JP | 8-249617 | 9/1996 |
| JP | 11-064523 | 3/1999 |
| JP | 11-230761 | 8/1999 |
| JP | 2000-050992 | 2/2000 |
| JP | 2000-132535 | 5/2000 |
| JP | 2003-57050 | 2/2003 |

OTHER PUBLICATIONS

"MapQuest Releases New Mobile MapQuest Version 3.0—Brief Article—Product Announcement," from http://www.findarticles.com, Oct. 2001.

"MapQuest.Com Delivers Wireless Driving Directions to Palm Vii Organizer Users," from http://www.findarticles.com, May 31, 1999.

"Sprint Selects MapQuest.com to Provide Internet-based Driving Directions to Wireless Web Phone Users—Company Business and Marketing," from http:www.findarticles.com, Sep. 13, 1999.

511 TakeTransitSM Trip Planner, http://www.transitinfo.org/tripplanner/help.asp 5 pgs.

Ahn, John Kwangho, Automatic map name placements system, RPI, Ph.D. Thesis, May 1984, pp. 1-84 (Abstract only).

Bahar, R.I., et al., "Algebraic Decision Diagrams and their Applications," ICCAD-93: ACM/IEEE International Conference on Computer Aided Design, pp. 188-191, Santa Clara, CA, Nov. 1993.

Bahar, R.I., et al., "An ADD-Based Algorithm for Shortest Path Back-Tracing of Large Graphs," GLSV: Proceedings Great Lakes Symposium on VLSI (GLSV): Design Automation of High Performance VLSI Systems, 1994.

Baier, C., et al., "Model checking continuous-time Markov chains by transient analysis," in Proceedings of CAV '00, Springer-Verlag, 2000.

Bertoli, P., et al., "Heuristic Search+Symbolic Model Checking=Efficient Conformant Planning," Proc. of IJCAI-2001, 2001.

Blythe, Jim, "An Overview of Planning Under Uncertainty," AI Magazine, 20(2), 1999, pp. 37-54.

Boutilier, C., et al., "Stochastic Dynamic Programming With Factored Representations," Artificial Intelligence, 2000.

Boutilier, R., et al., "Decision-Theoretic, High-level Agent Programming in the Situation Calculus," AAAI-2000, Seventeenth National Conference on Artificial Intelligence, Austin, Texas, Jul. 30-Aug. 2, 2000.

Burch, J.R., et al., "Symbolic Model Checking for Sequential Circuit Verification," Jul. 15, 1993, IEEE Transactions on Computer-Aided Design of Integrated Circuits and Systems, 13(4):401-424, 1994.

Chan, W., et al., "Model Checking Large Software Specifications," Software Engineering Notes, 21(6):156-166, Nov. 1996.

Cimatti, A., et al., "Conformant Planning via Model Checking," in ECP, 1999, pp. 21-34.

Cimatti, A., et al., "Planning via model checking: A decision procedure for {AR}," in ECP, 1997, pp. 130-142.

Cleaveland, R., et al., "The Concurrency Workbench: a Semantic Based Tool for the Verification of Concurrent Systems," Sep. 13, 1994, in Proceedings of CAV '00, pp. 36-72.

Cohen, Alan, "A MapQuest Road Trip," PC Magazine, Jun. 2003, from http://www.findarticles.com.

Draper, D., et al., "Probabilistic Planning with Information Gathering and Contingent Execution," in Proceedings of AIPS94, pp. 31-36, 1994.

Eiter, T., et al., "Planning under Incomplete Knowledge," vol. 1861, 2000.

Feng, Z., et al., "Symbolic Heuristic Search for Factored Markov Decision Processes," in Proceedings of the Eighteenth National Conference on Artificial Intelligence (AAAI-02), Edmonton, Alberta, Canada, Jul. 2002.

Feng, Z., et al., "Symbolic LAO Search for Factored Markov Decision Processes," AIPS 2002 Workshop on Planning via Model Checking, Toulouse, France, Apr. 23, 2002.

Fetch Technologies, http://www.fetch.com/technology.asp, 2 pgs.

Finzi, A., et al., "Open World Planning in the Situation Calculus," in Proceedings of AAAI 2000, 2000.

Gallanis, Peter J., "AAIW awash with innovation," from http://www.findarticles.com, Nov. 22, 1999.

Giunchiglia, E., et al., "Representing Action: Indeterminacy and Ramifications," Artificial Intelligence, 95(2): 409-438, 1997.

Goldman, Robert P., "Conditional Linear Planning," in K. Hammond, editor, Proceedings of 2nd International Conference on AI Planning Systems, American Association for Artificial Intelligence, pp. 80-85, Menlo Park, California, 1994.

Hansen, E., et al., "'LAO: A heuristic search algorithm that finds solutions with loops," Artificial Intelligence 129, Elsevier Science, pp. 35-62, 2001.

Havelund, K., et al., "Model Checking Java Programs using Java PathFinder," Mar. 12, 1999, International Journal on Software Tools for Technology Transfer, 2(4):366-381, Apr. 2000.

Hoey, J., et al., "Optimal and Approximate Stochastic Planning using Decision Diagrams," Technical Report No. TR-00-05, Department of Computer Science, University of British Columbia, Vancouver, BC, Canada, Jun. 10, 2000.

Hoey, J., et al., "SPUDD: Stochastic Planning using Decision Diagrams," in Fifteenth Conference on Uncertainty in Artificial Intelligence (UAI99), 1999.

Holzmann, G.J., et al., "The Model Checker SPIN," IEEE Trans. Software Eng., vol. 23, pp. 279-295, May 1997.

Hong, Jia-Wei, et al., "Image-Based Navigation Using 360 degree Views," Proc. of Image Understanding Workshop, pp. 781-791, 1990.

ISI's Intelligent Travel Agent Program, "Virtual Travel Agent" program lead by Steve Minton, http://www.hpcwire.com/dsstar/00/0404/101441.html, 2 pgs.

Kushmerick, N., et al., "An Algorithm for Probabilistic Planning," In Proceedings of AAAI-94, 1994.

Leone, N., et al., "The DLV System for Knowledge Representation and Reasoning," Technical Report INFSYS RR-1843-02-14, Technical University, Wien, Oct. 2002.

MapQuest® Wireless Overview, from http://www.mapquestservices.com/mobile, copyrighted 2004.

Nau, D., et al., "SHOP: Simple Hierarchical Ordered Planner," in Proceedings of the International Joint Conference on Artificial Intelligence (IJCAI99), ed., T. Dean, Stockholm, Sweden, Morgan Kaufmann Publishers, San Francisco, 1999, pp. 968-973.

Nau, D., et al., "Total-Order Planning with Partially Ordered Subtasks," in Proceedings of IJCAI01, 2001.

Oh, Sung Jun, et al., "A study of the characteristics of an omnidirectional vision sensor," Advances in Image Processing, SPIE, vol. 804, pp. 259-268, 1987.

PCT International Search Report, PCT/US04/06718, Jul. 31, 2006, 3 pages.

PCT Notification of Transmittal of the International Search Report and the Written Opinion of the International Searching Authority, or the Declaration for PCT/US2004/006718, mailed Sep. 23, 2004, 9 pages.

Penberthy, J.S., et al., "UCPOP: A Sound, Complete, Partial Order Planner for ADL," in Nebel, B., et al, editors, KR'92, Principles of Knowledge Representation and Reasoning: Proceedings of the Third International Conference, San Mateo, California, Morgan Kaufmann, pp. 103-114.

Pendrith, Mark D., "Distributed Reinforcement Learning for a Traffic Engineering Application," DaimlerChrysler Research & Technology Center, pp. 404-411.

Peot, M., et al., "Conditional Nonlinear Planning," in James Hendler, de., Proceedings of the First International Conference on AI Planning Systems, College Park, Maryland, Jun. 15-17, 1992.

Pryor, L., et al., "Planning for Contingencies: A Decision-based Approach," JAIR, 4:287-339, 1996.

Rintanen, J., "Constructing Conditional Plans by a Theorem-Prover," Journal of Artificial Intelligence Research, 10:323-352, 1999.

Smith, D.E., et al., "Conformant Graphplan," in Proceedings of the 15th National Conference on Artificial Intelligence, AAAI-98, 1998.

St-Aubin, R., et al., "APRICODD: Approximate Policy Construction Using Decision Diagrams," Proceedings of the conference on Neural Information Processing Systems (NIPS), pp. 1089-1095, 2000.

Wang, X.F., et al., "Anytime Algorithm for Agent-mediated Merchant Information Gathering," Agents 2000 Conference.

Weld, D., et al., "Extending Graphplan to Handle Uncertainty & Sensing Actions," in Proceedings of AAAI-98, 1998.

Weld, Daniel S., "Recent Advances in AI Planning," AI Magazine, 1999, Oct. 8, 1998.

Woods, Lynn, "Getting There Via Computer—computerized mapping software—Evaluation," Oct. 1998.

Zhang, Zhongfei, et al. "Segment-Based Matching for Visual Navigation," Computer and Information Science Departments, University of Massachusetts at Amherst, COINS TR91-35, pp. 1-37, Apr. 1991.

Zheng, Jiang Yu, et al., "Panoramic Representation for Route Recognition by a Mobile Robot," International Journal of Computer Vision, 9:1, pp. 55-76, 1992.

305 a map and the locations
310 user preferences
315 time parameters
320 location parameters
325 planner controls 335 map with indicated locations
340 plan information (plan tree)
350 Statistics for the run and controls for the next run

METHOD AND APPARATUS FOR AN ITINERARY PLANNER

RELATED APPLICATIONS

The present application claims priority to U.S. Provisional Application Ser. No. 60/451,116, filed Feb. 26, 2003, which is incorporated herein in its entirety, and is a divisional application of U.S. patent application Ser. No. 10/740,143, filed Dec. 17, 2003 now U.S. Pat. No. 7,895,065.

FIELD OF THE INVENTION

The present invention relates to planning, and more particularly to contingency based planning.

BACKGROUND

Two of the critical obstacles to wider real-world use of plans are the inability of planners to deal with incomplete information, and the slowness of planners in general and in particular, those that do deal with incomplete knowledge.

While most planners assume all information needed to generate the plan is available beforehand, this is not typically the case in realistic planning situations. The system does not know beforehand which gate a flight is going to depart from, for instance. Conditional planning constitutes a solution in those cases in which the facts needed to make a decision will become known during execution, but is not known during planning. A conditional planner generates a conditional plan that, for each alternative for the unknown facts, provides a sequence of actions. The appropriate actions are then chosen during execution based on information gathered. The conditional plan generated is a tree or a graph structure. The problems with this approach are that (1) it is computationally expensive to build these conditional plans (2) the plans can be large and therefore expensive to store and transfer (3) it is expensive to execute these large plans (4) this is not a good approach for all cases of unknown information.

One prior art planner uses a non-traditional planning algorithm in which the state of the world is completely known before the next step is computed. The prior art planners are inefficient and cannot be practically used to solve problems of the size that would be useful in the real world.

SUMMARY OF THE INVENTION

A method and apparatus for an itinerary planner is described. The itinerary planner generates itineraries for visiting locations which are personalized to the user's preferences. Unknown conditions are handled by contingency plans that the itinerary planner generates in an anytime manner. The first itineraries are derived in a short time, and as more computation time is allowed, additional itineraries that better suit the preferences of the user are obtained.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
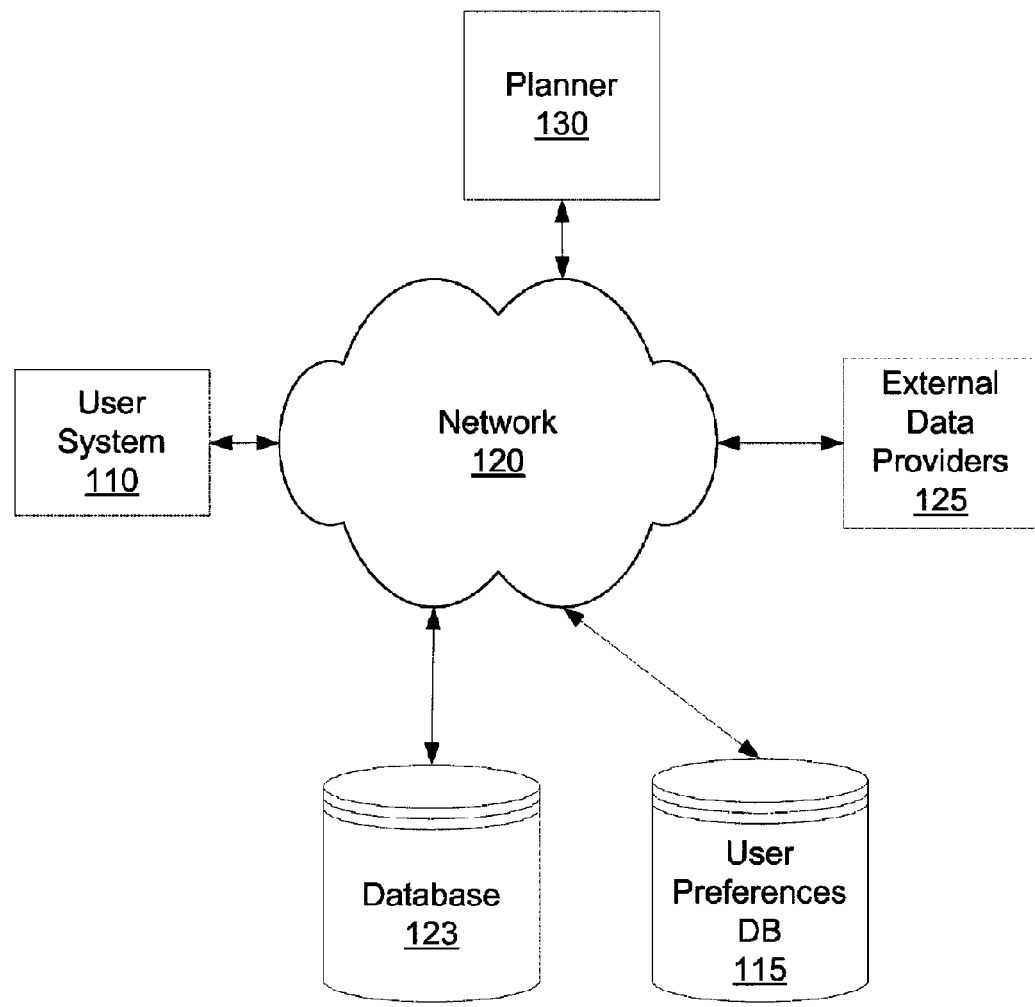
FIG. 1 is a block diagram of one embodiment of a network on which the planner may be used.

A method and apparatus for a contingent itinerary planner is described. The planner is a fast hierarchical task network (HTN) planner that generates conditional scheduled plans in an anytime way. An anytime algorithm is one that generates better solutions as it is allowed more computational time. The planner therefore provides a fast solution, and as more time is provided it generates better solutions. HTN planning facilitates planning by decomposing the problem into sub-problems for which known solutions can be used. This hierarchical planning approach allows plan fragments to be reused, which improves efficiency.

The contingent itinerary planning solves the problems of uncertainty—the lack of knowledge at the time the plan is created—and personalization—ensuring that the plan best meets the needs of a user—in a timely manner.

The lack of knowledge and uncertainty is solved by merging contingency planning with hierarchical task network (HTN) planning and by explicitly declaring the contingencies and their possible outcomes. HTN planners have very high performance compared to other kinds of planners but have not been used to date for contingency planning. Explicitly declaring which contingencies to handle, under what circumstances to do so, and what the outcomes are to be simplifies the computations that need to be accomplished which increases the efficiency of the planner. This makes it possible for the planner to use a simpler language that has better computational properties than a more complete solution.

The planner generates a conditional plan in which each outcome of each declared contingency is considered. Each outcome generates a new branch in the plan so that there is a plan for any combination of contingencies possible according to the declarations.

Lack of knowledge and uncertainty is handled by representing these as contingencies at the point when that information is needed in the plan. The result is a conditional plan in which there are decision points corresponding to the use of the unknown or uncertain information. At those points, the user of the plan determines what the state of the world really is, and chooses the branch of the plan to execute. In this way, the plan is still useful even if it depends on information that is unknown or uncertain at the time that the plan is constructed.

The problem of Personalization is solved by choosing the activities to be included in the plan based on the preferences of the user for general classes of activities. The value to the user of the plans generated is computed and the best plan generated so far is presented to the user. If requested by the user, the planner can compute a better plan. This solution gives the user good plans and allows the user to decide how much time to spend on optimizing the plans.

HTN (hierarchical task network) is basically a plan created from smaller sub-plans. The HTN uses primitive tasks (actions an agent can do directly), and decomposes non-primitive tasks into a set of primitive tasks, with temporal and logical constraints. HTN is useful for creating large plans from smaller components.

FIG. 1 is a block diagram of one embodiment of a network on which the itinerary agent may be used. The user system 110 may be a computer system, an in-car navigation system, a cellular telephone, a palm top, a special purpose appliance, a GPS system, or any other system capable of displaying a route to a user. In one embodiment, the user system 110 may be a computer system with a printer connection, so that a route may be printed, either as an image or as text, as is known in the art.

The user system 110 is coupled via network 120 to planner 130. The connection between user system 110 and the network 120 may be via any method, including direct connection, DSL, wireless, Bluetooth, the telephone network, or any other method of connectivity.

Planner 130 may reside on a computer system, such as a server. In one embodiment, the planner 130 may be on the same computer system as the user system 110. In another embodiment, the planner 130 may be on a remote system, accessible through a public network, such as the Internet. In another embodiment, the planner 130 may be accessible through a Local Area Network, a Wide Area Network, a Virtual Private Network, or any other system.

The planner 130 is used to generate a conditional HTN-based plan, in accordance with the present invention. This plan is then sent to the user system 110. The planner 130, in one embodiment, accesses external data providers 125 to obtain data. For example, external data providers may be used to provide public information.

One exemplary use of the planner is as an itinerary planner. In that instance, the planner 130 calculates an itinerary for a user, which meets the user's preferences. In one embodiment, the planner 130 may use external data providers 125 to obtain information about locations and activities available to the user.

In one embodiment, primarily static factors, such as locations and activities are stored in database 123. These types of factors, in one embodiment, are used by planner 130. Therefore, they are stored in a database 123. In one embodiment, the database 123 is local to planner 130, alternatively, the database 123 may be a remote database, or a distributed database.

The user preferences are obtained when the user utilizes the planner 130. In one embodiment, user preference database 115 may be used to store the users' preferences. In another embodiment, user preference data may be received from the user system 110, and may not be stored by the planner 130.

Figure 2:
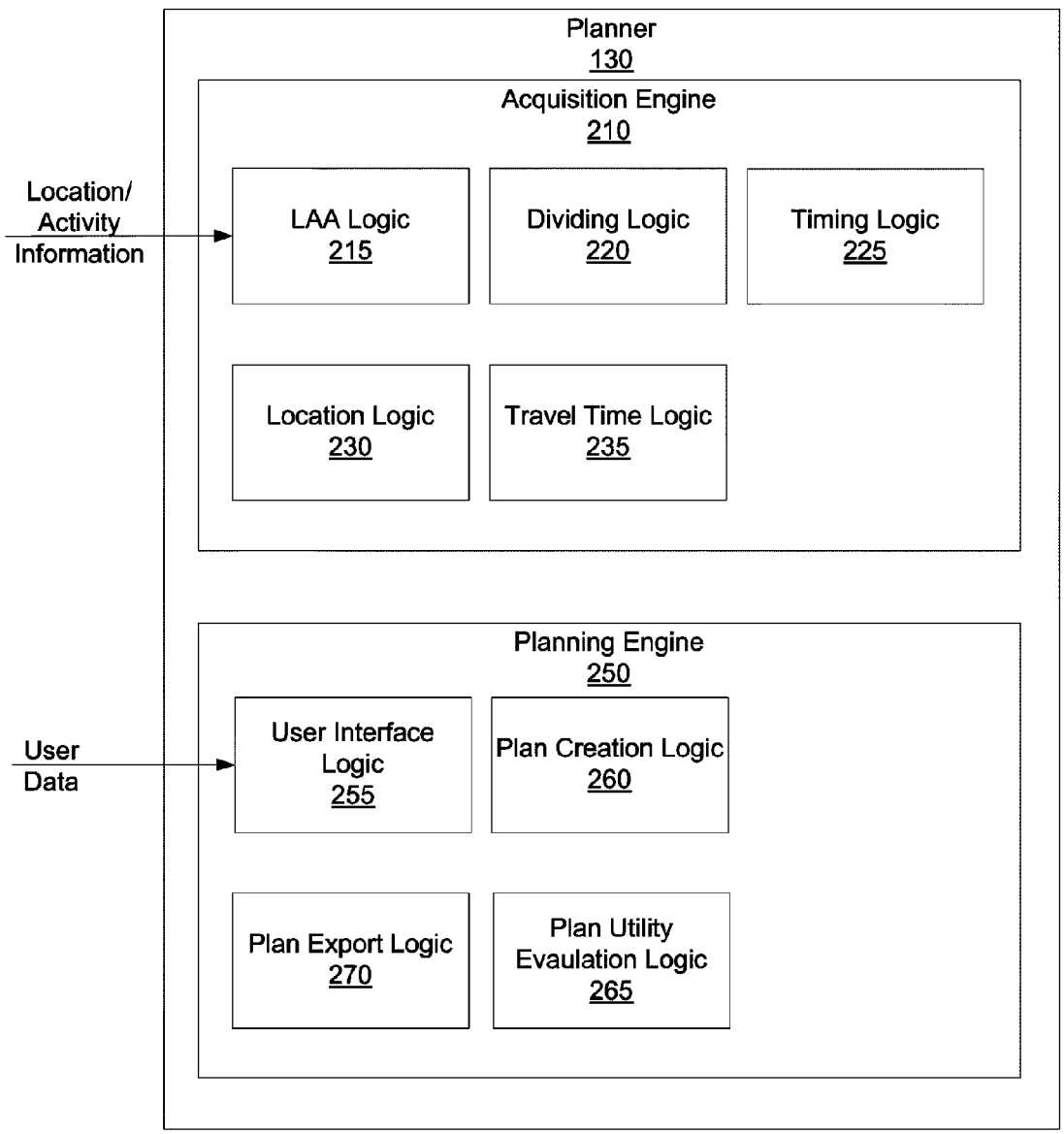
FIG. 2 is a block diagram of one embodiment of a planner in accordance with the present invention.

FIG. 2 is a block diagram of one embodiment of a planner in accordance with the present invention. The planner 130 includes an acquisition engine 210 and a planning engine 250.

The acquisition engine 210 includes a location and activity acquisition logic (LAA logic) 215. The LAA logic 215 acquires location and activity information for the planning space. For example, for itinerary planning, the LAA logic 215 acquires locations and activities of interest to tourists. For Web Service planning, the LAA logic 215 acquires virtual locations (for example universal resource indicators (URIs) of various types of services, and the activities correspond to services provided by the various locations. In this context, the term "location" refers to not physical locations, but virtual locations, such as locations defined by universal resource indicators (URIs).

The dividing logic 220 divides any multi-step activities into their separate steps. For itinerary planning, multi-step activities are activities which are separated by a time (i.e. purchase of theater tickets and attending the theater). For Web Service planning, multi-step activities may include activities that require visiting two different locations (i.e. credit card validation and credit card charging.)

The timing logic 225 associates a time with each location. For example, for itinerary planning, the time it takes to do an activity. For Web Service planning, the time may be the time required to perform a service.

The location logic 230 identifies the relative location of each activity or location.

The travel time logic 235 calculates the travel time between each activity/location. In one embodiment, for the itinerary planner, the travel time logic 235 calculates the travel.

The planning engine 250 includes a user interface logic 255 to receive user data. In one embodiment, the user interface is a Web based interface. In that instance, the user interface logic 255 presents the user interface on the Web, and accepts the posted data from the user.

The data received by the user interface logic 255 is passed to the plan creation logic 260. The plan creation logic 260 creates a plan that meets the user's utility requirements. If the user indicates that the presented plan does not meet his or her preferences, the plan creation logic 260 creates a new plan. The plan utility evaluation logic 265 determines that the utility of the new plan is greater than the utility of the rejected plan by a delta. In one embodiment, the delta is set by the user. In another embodiment, the user may, in rejecting a plan, indicate the particular feature that is disliked. For example, a plan may call for driving 45 minutes to a location deemed to be of high utility. The user may, in one embodiment, indicate that this is too much driving, and therefore, the utility of the location should be downgraded.

Plan export logic 270 permits the user to export the plan created by planner 130, to a mobile system. The planner 130 thereby provides a plan that the user can take with himself or herself.

Figure 3A:
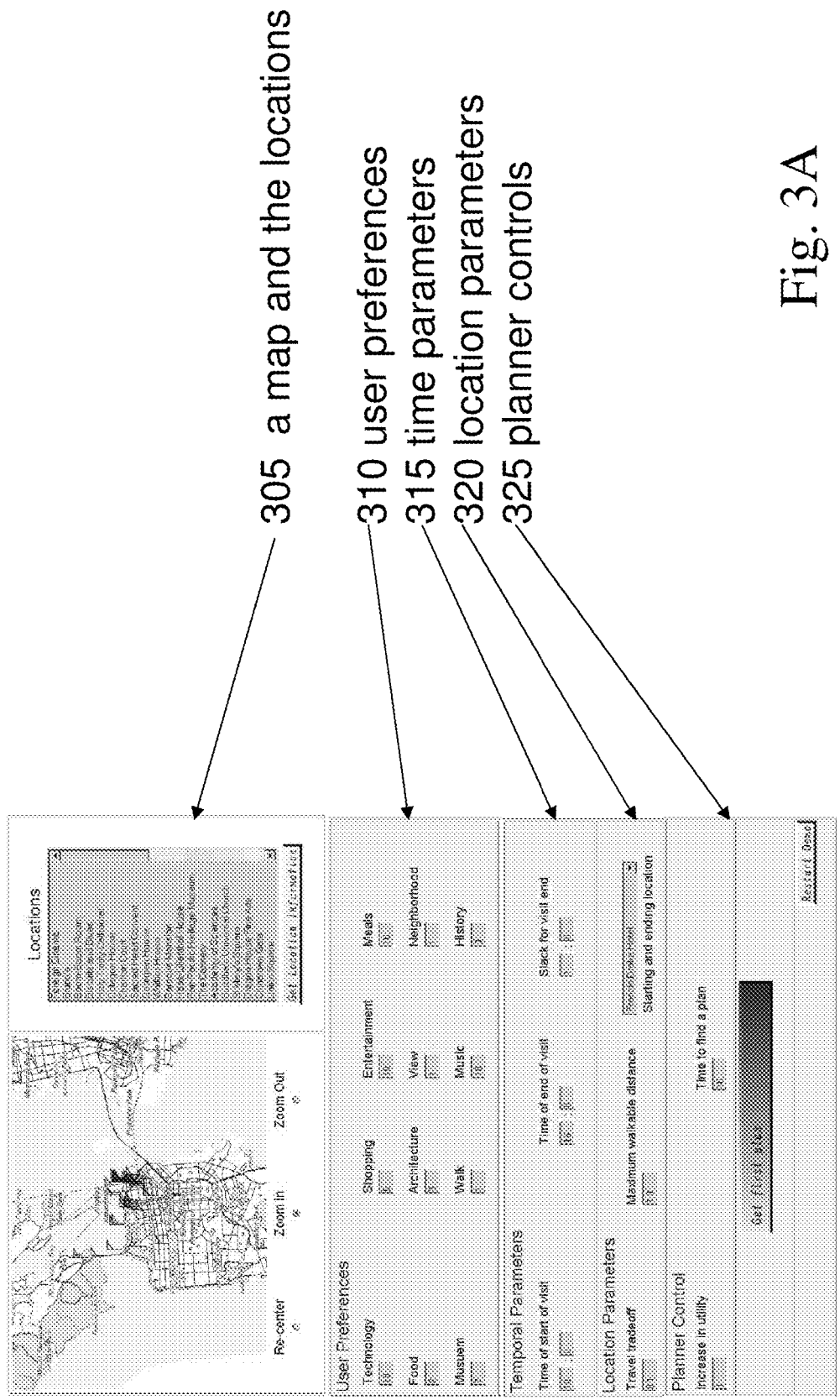
FIGS. 3A-B are exemplary user interfaces for the planner.

FIGS. 3A and B are exemplary user interfaces for the planner. FIG. 3A illustrates one embodiment of the itinerary planner interface. The interface 300 includes a map of the local area, and a listing of the available activities & locations 305. The user may, in one embodiment, select certain activities and locations to exclude or include. This restricts the planning space used by the itinerary planner.

The user interface 300 also includes user preferences 310. User preferences 310 indicates what weight (value) a user places on each category. An exemplary set of categories is illustrated here. The categories, for a travel planner, include: technology, shopping, entertainment, meals, food, architecture, view, neighborhood, museum, walk, music, and history. This list of categories 310 is only exemplary. A different list of categories may be used. For example, for a location which has activities centered around the Ocean, the categories may include: swimming, scuba diving, tanning, etc. In one embodiment, the set of available categories is based on the set of available activities in the area. Thus, for example, a land-locked location will not have a category such as "walking on the beach." In one embodiment, the user may enter his or her preferences once, upon initially accessing the system, and the system may store these preferences. In another embodiment, the user preferences may be learned based on user behavior.

For example, if the user always prefers plans that include "shopping" the system learns that the user has a preference for shopping. In one embodiment, the user may alter the preferences on a case-by-case basis, but the system retains the basic preferences. In that instance, in one embodiment, the user interface may display the "basic preferences" highlighted to the user, enabling the user to simply accept the "basic preferences" or make any changes desired.

The time parameters 315 indicate the starting date and time and stopping date and time for the tour. In one embodiment, time parameters include "slack for time end" which indicates how much flexibility there is in the ending time.

Location parameters 320 indicate the starting location and stopping location. In this example, the starting and stopping locations are the same. However, in another embodiment, separate starting and stopping locations may be defined. Travel trade-off indicates the user's preference for nearby attractions, compared to attractions that are further away. Maximum walkable distance indicates the distance a user is willing to walk. This determines whether the itinerary planner will suggest driving or walking, and the accessibility of certain locations.

Planner controls 325 permit the user to adjust certain parameters of the search. For example the "increase in utility" is the delta by which a new plan must be better than the old plan. The use of this delta is described in more detail below. The time to find a plan provides a stopping point for the iterations, to find a plan.

Figure 3B:
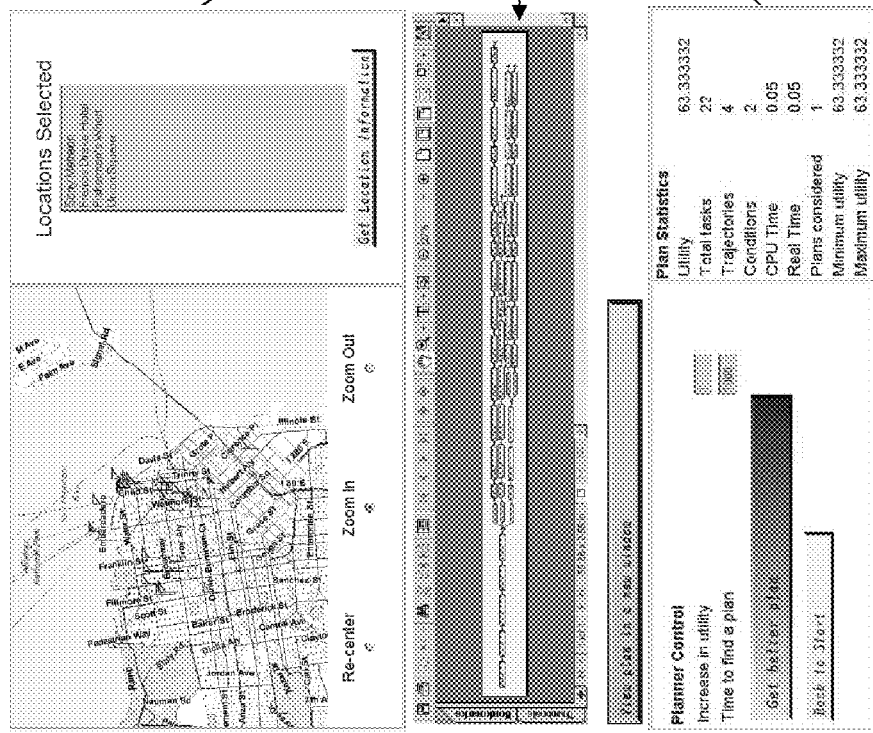

FIG. 3B illustrates one embodiment of the results screen for the itinerary planner. As can be seen, the map 335 now includes the indications for the locations which were chosen by the plan. The list of locations only includes those locations that are part of the plan as well. IN one embodiment, the user may select a location from the list of locations, to obtain more information about the location.

The plan information 340 is a plan tree showing the decision points the user has available, while the statistics 350 show the results for the run, and provide adjustable controls for the user, if the user wishes to iterate the plan. In another embodiment, the results page may simply include the map and locations 335 and an option to iterate the plan. In one embodiment, the user may indicate what specific feature of the plan is objected to, when requesting a plan iteration.

Figure 4:
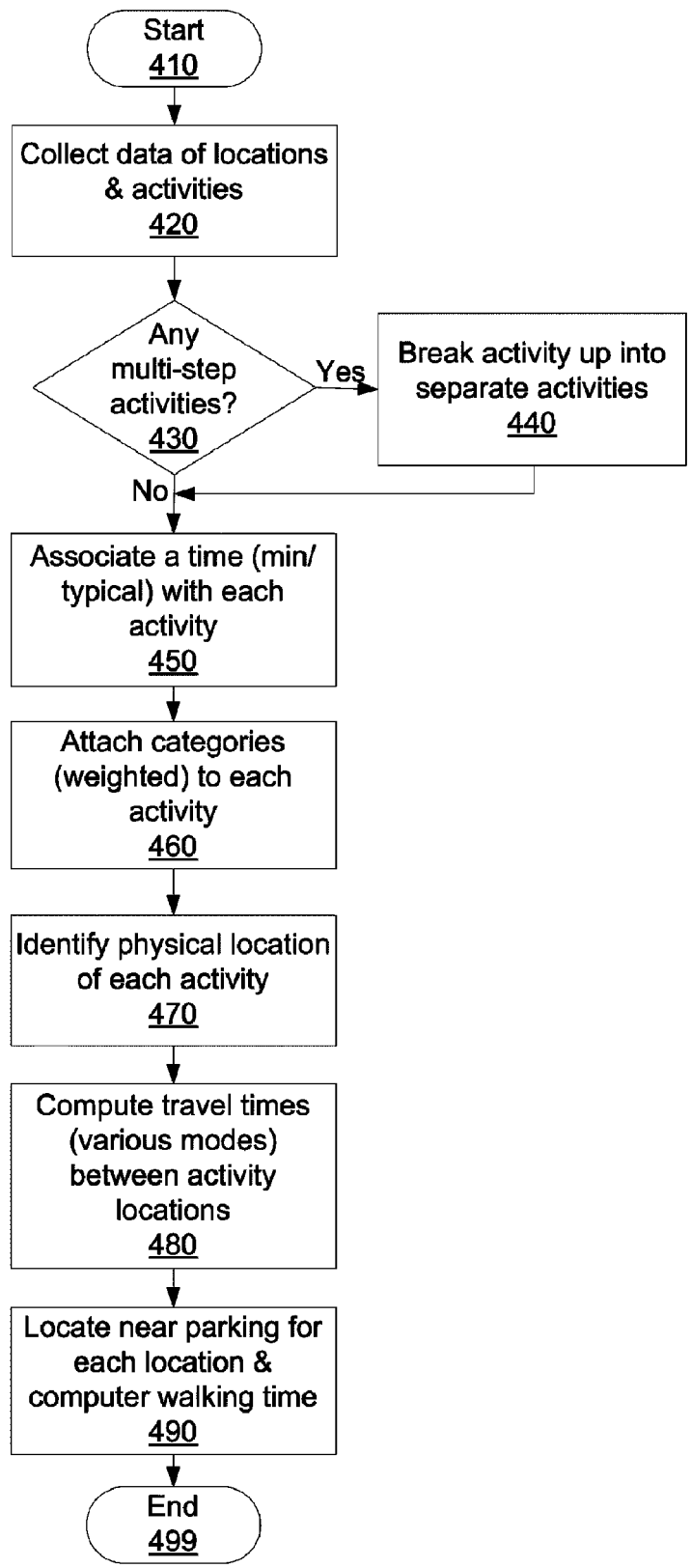
FIG. 4 is a flow diagram of one embodiment of collecting information for an itinerary planner.

FIG. 4 is a flow diagram of one embodiment of collecting information for an itinerary planner. The process starts at block 410. In one embodiment, this process is started when a new location is added to the itinerary planner.

At block 420, data about the locations and activities available in the current selected City/County/State/Country are obtained. In one embodiment, the World Wide Web is used to research such locations and activities. In another embodiment, a preexisting list of activities and locations of interest from a single source, such as Frommer's Travel Guide, may be used.

At block 430, the process determines whether there are any multi-step activities. Multi-step activities require two or more steps separated by a time. For example, for attending the theater, the tickets may need to be ordered or picked up some hours prior to attending the performance. If there are multi-step activities, at block 440, the activity is broken up into its sub-steps, i.e. separate activities. The system, in one embodiment, keeps track of the constraints between these activities and maintains them. For example, if you have not obtained a ticket, you cannot not go to the concert, and if you have a ticket, you ought to go to the concert. In one embodiment, the activities may also have temporal constraints. If you want to pick up your developed photographs, you ought to drop off the photographs at least one hour earlier. Thus, these "separate activities" actually may retain temporal or dependency constrains.

At block 450, a time is associated with each activity. In one embodiment, the time for non-rigid activities is minimum time and typical time. For example, certain activities are rigidly timed. For example, a cable car ride from a first location to a second location is of a defined duration. However, the amount of time spent touring China Town, or shopping, varies by the individual. Therefore, in one embodiment, the system uses various sources to identify a minimum time and a typical time for the activity. In one embodiment, the user's preferences may change this time estimation. Thus, if the user indicates that he or she values shopping highly, the assumed time for a shopping activity is increased.

At block 460, categories are attached to each activity. The categories, as noted above, may be obtained from a third party provider.

At block 470, the physical location of each activity is identified. In one embodiment, GPS coordinates are used. Other coordinate systems may be used. The relevant information is the ability to calculate the distance between various locations. The "absolute location" is not relevant.

At block 480, the travel times between various activity locations are calculated. In one embodiment, travel times are calculated for various modes of travel. Thus, for example, the system calculates a distance traveled by foot, by car, or by other vehicles. In one embodiment, the system takes into account that traveling on foot or bicycle may use different paths and shortcuts than travel by car or other vehicle.

At block 490, parking is located for each location. In one embodiment, the routing agent described in application Ser. No. 10/739,543 filed Dec. 17, 2003, entitled A Method and Apparatus for a Routing Agent, now issued as U.S. Pat. No. 7,239,602, may be used. This enables the itinerary planning agent to identify certain locations that are inaccessible for certain users. For example, if the nearest parking to a site is 0.5 miles, but a user is unable to walk more than 0.3 miles, that site may not be available for the user. The process terminates at block 499.

Figure 5A:
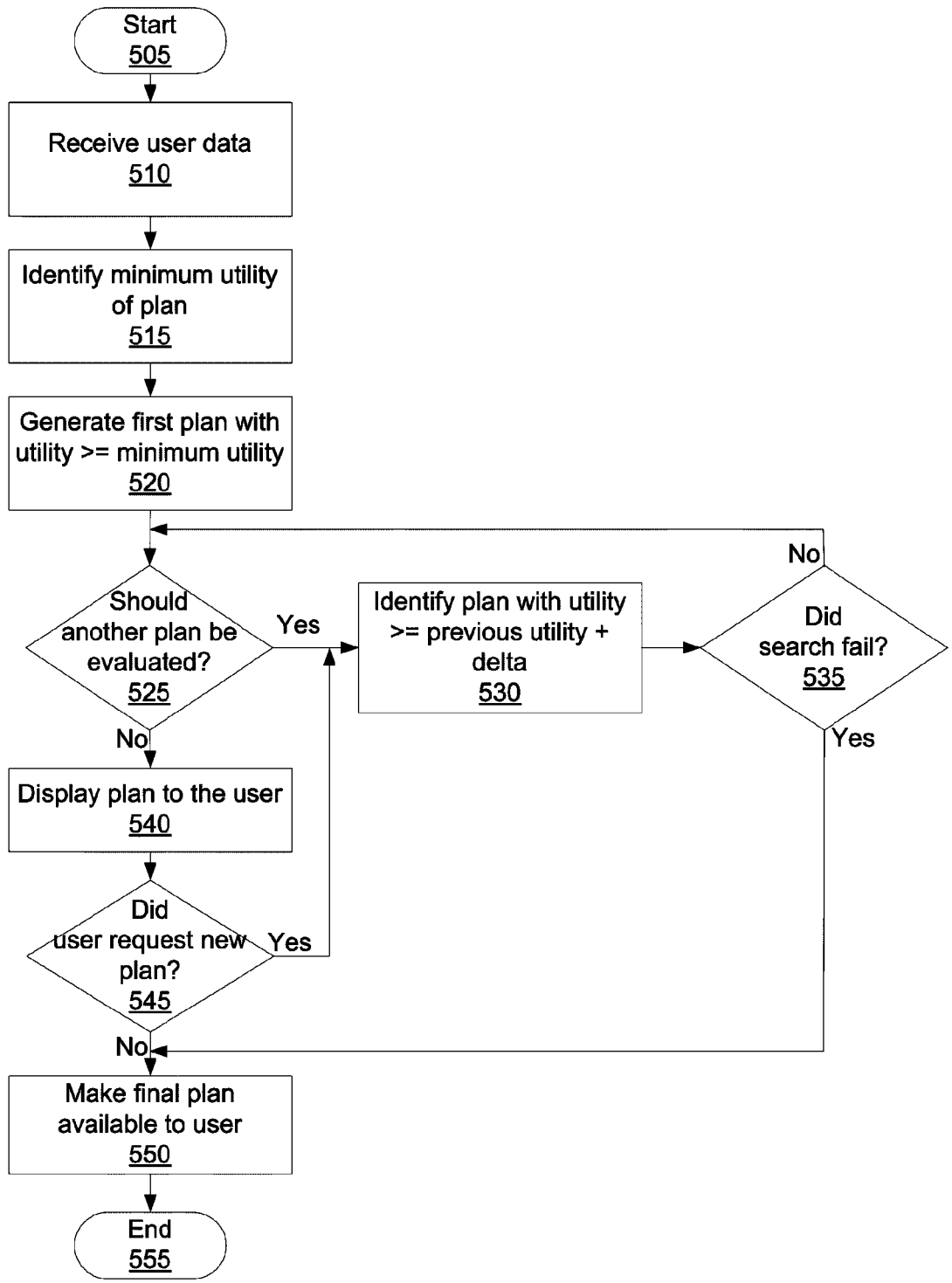
FIG. 5A is a flow diagram of one embodiment of using the planner.

FIG. 5A is a flow diagram of one embodiment of using the itinerary planner. The process starts at block 505. At block 510, information is received from the user. This information includes the user's preferences, among other things. In one embodiment, as shown in FIG. 3A, this information includes the user's preferences for various properties by which the utility of each option is evaluated.

At block 515, the minimum utility of the plan that will be selected is chosen. In one embodiment, this variable is set by the user. In another embodiment, this variable is set by the system. In one embodiment, the default value of zero is set by the system.

At block 520, the first plan having the required level of utility is constructed. This is described in more detail below with respect to FIG. 5B.

At block 525, the process determines whether another plan should be evaluated. In one embodiment, the user sets a maximum time for evaluating a good plan. In another embodiment, the first good plan is shown to the user.

At block 530, if another plan should be evaluated, the process attempts to identify a plan having a utility of Delta above the utility of the current plan. The level of Delta is set by the user, in one embodiment. In another embodiment, the system sets the level of delta. In one embodiment, the default delta is set to +1. At block 535, the process determines whether the attempt to find an improved plan has succeeded.

If the plan with the improved utility is found, the process returns to block 525, to determine whether another plan should be evaluated. If the process fails, the process continues to block 550.

If, at block 525, the process determined that the current plan should be displayed to the user—because a Stop has been received, time is up, or the first good plan was selected by the user—the current plan is displayed to the user at block 540. At block 545, the process determines whether the user has requested another evaluation, i.e. the user has requested a better plan. If so, the process returns to block 530, to attempt to identify a plan with a utility of current+delta.

At block 550, the final plan is shown to the user. In one embodiment, the user may be able to download the plan to a portable device such as a laptop, telephone, GPS device, or palmtop. This enables the plan to be portable. The process then ends at block 555.

Figure 5B:
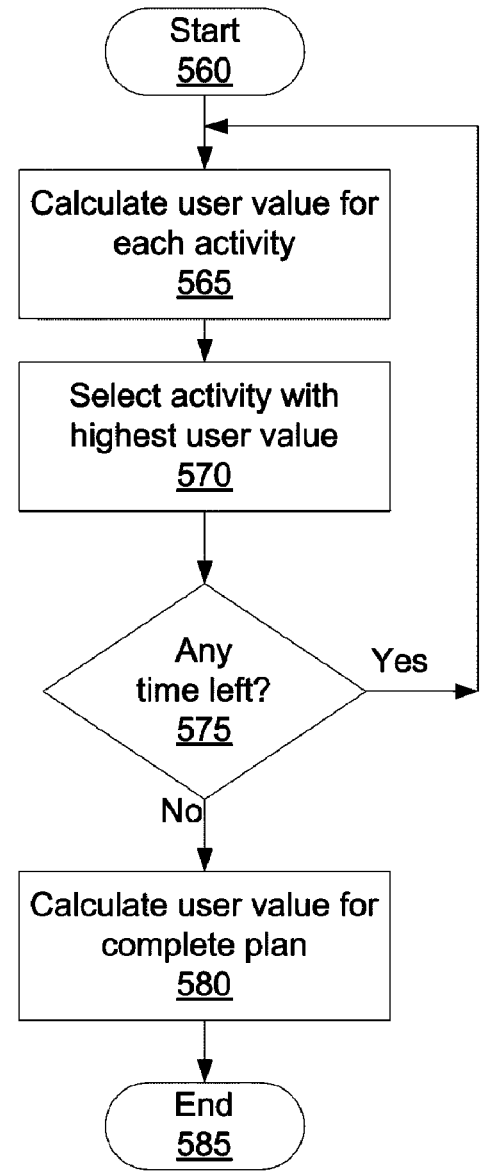
FIG. 5B is a flowchart of one embodiment of generating a plan.

FIG. 5B is a flowchart of one embodiment of generating a plan. In one embodiment, this flowchart corresponds to block 520 of FIG. 5A. The process starts at block 560, when the system receives the user preferences.

At block 565, a user value is calculated for the available activities. In one embodiment, the user value is a function of: (1) the user preference; (2) the characteristics of the activity; (3) the distance between the activity and the current location; (4) the means of transportation available. In one embodiment, user value=activity value for category*user pref for category−travel cost.

At block 570, the activity with the highest user value is selected. In one embodiment, if multiple activities with the same user value are available, one is selected at random. In another embodiment, if multiple activities with the same user value are available, the travel time is made more costly, to differentiate between the activities.

At block 575, the process determines whether there is time left, after the completion of the activity. If so, the process returns to block 565, to recalculate the user values, taking into account the ending location of the first activity, and then select the next highest value activity. In another embodiment, the activity values are not recalculated, and the process returns to block 570 to select the next activity. If there is no time left, the process continues to block 580.

At block 580, the user value for the complete plan is calculated, providing an overall value to the plan. At block 585, the process ends. Note that a "better" plan is selected by varying the selection among equally highly valued items, selecting more activities, that have cumulatively higher user value, or selecting a next-best plan. Furthermore, since the ending location of an activity affects the selection of the next activity, a change percolates through the entire plan, producing a significantly different plan.

Figure 6:
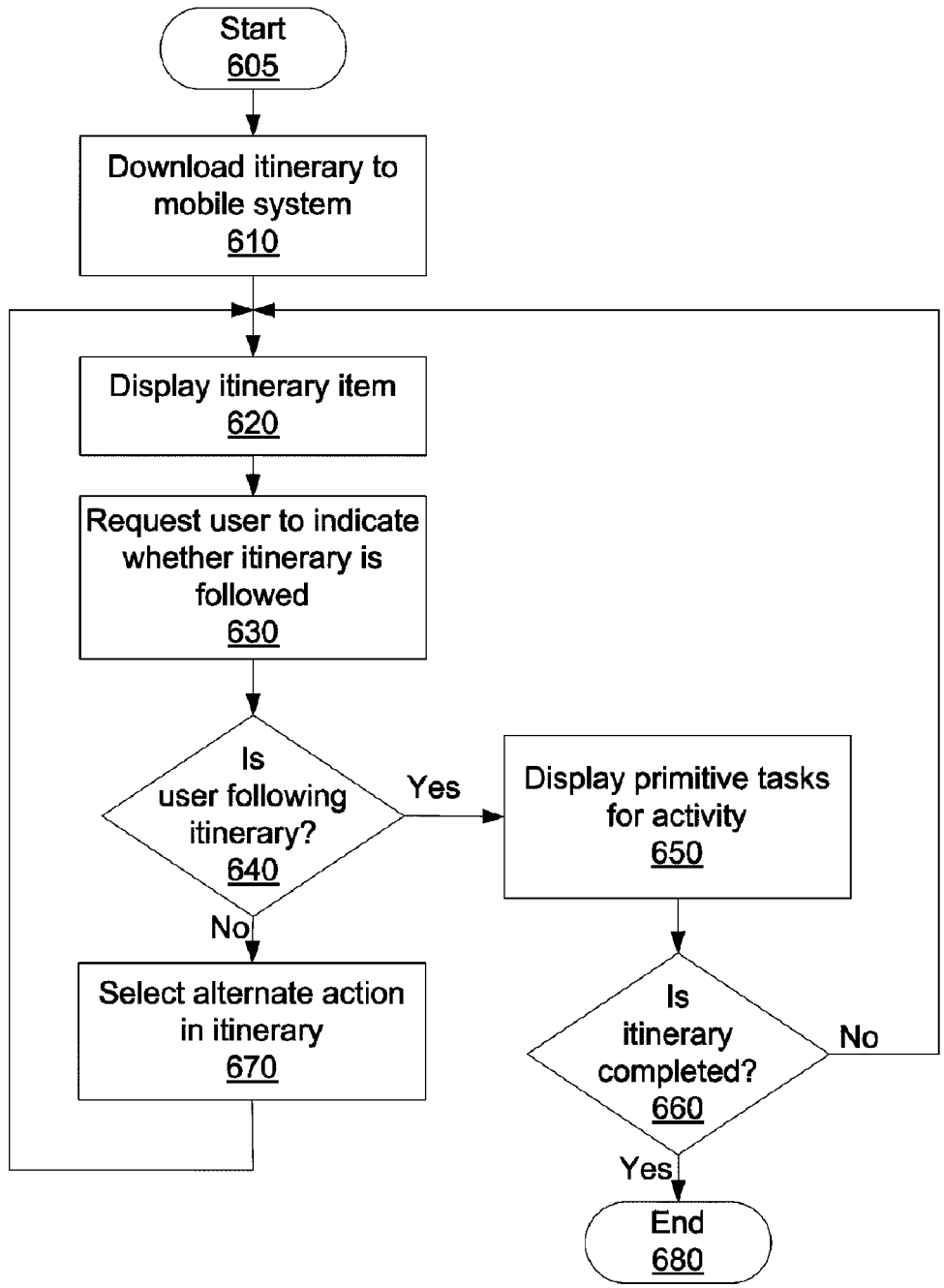
FIG. 6 is a flow diagram of one embodiment of using the plan created by the itinerary planner.

FIG. 6 is a flow diagram of following the itinerary generated by the planner. The process starts at block 605. At block 610, the itinerary is downloaded to a mobile system. In one embodiment, if the user connected to the planner with the mobile system, this step may be skipped.

At block 620, the first item in the itinerary is displayed. In one embodiment, the items in the itinerary are primitive tasks (i.e. tasks that cannot be further broken down) are displayed. The primitive tasks, in one embodiment, include:

Transportation: Driving; Parking; Walking
Touring
Playing
Waiting
Buying ticket; Attending concert
Getting on a cable car; Getting off a cable car
Eating In one embodiment, the next "activity" is displayed. In one embodiment, the activity has associated with it a time, and a starting and ending location. The starting location is the current location (i.e. the ending location of the previous itinerary item, or the true starting point of the user).

At block 630, the user may indicate that he or she intends to follow the itinerary plan. Since the plan created by the planner is a contingent plan, there are actions to be taken whether or not the user follows the plan. For example, a user may decide that he or she does not wish to go to China Town, even though that is the next itinerary step. In one embodiment, the user may 'abort' the current itinerary item at any time. In another embodiment, in a GPS enabled system—or another system which is able to identify the user's current location—the system may automatically determine whether the user is following the itinerary.

At block 640, the process determines whether the user followed the itinerary. If so, the process continues to block 650, and the primitive tasks associated with the itinerary item are displayed for the user to follow. Thus, for example, for the activity of cable car tour of San Francisco, the primitive steps may be: Drive to Civic Center Parking (including directions), Park, Walk to Cable Car Stop (including directions), Get on Cable Car at Civic Center Cable Car stop, Ride Cable Car, Get off at Folsom Street Stop.

In one embodiment, sub-steps of the itinerary may be planned using the routing engine described in application Ser. No. 10/739,543, filed Dec. 17, 2003, entitled "A Method And Apparatus For A Routing Agent," now issued as U.S. Pat. No. 7,239,602. For example, the route to the parking garage (step one of the itinerary) may be calculated using the routing engine, as is described in that application. In one embodiment, other sub-steps of the itinerary may be planned using errands engine described in co-pending application Ser. No. 10/739,553, filed Dec. 17, 2003, entitled "A Method And Apparatus To Implement An Errands Engine,". For example, the errands engine may be used to create an optimal tour to fill basic needs, such as ATMs, beverages, or to explore specific attractions or activities within allotted time and money, accounting for personal preferences.

The process then continues to block 660. At block 660, the process determines whether the plan has been completed. If the plan is not yet completed, the process returns to block 620, and the next itinerary item is described. Otherwise, the process continues to block 680, and ends.

If the user indicates that he or she is not following the itinerary, at block 670, the alternative itinerary item is selected. For example, given the starting point, the original itinerary item may be "Visit China Town" and the alternative item may be "Go to Dragon Museum." For each choice the user may make, an alternative is presented, if the user declines to follow the itinerary. The process then continues to block 620, and the alternate itinerary choice is displayed for the user.

Figure 7:
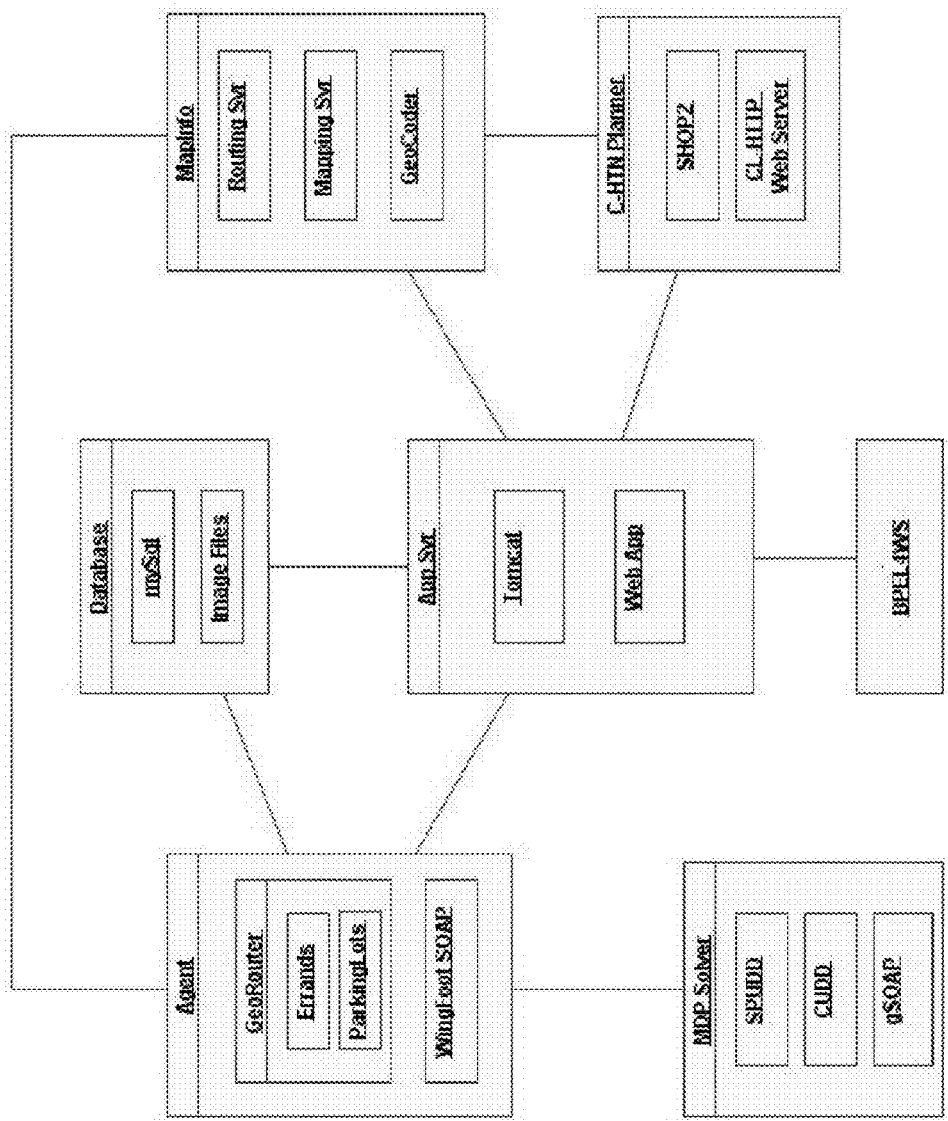
FIG. 7 is a block diagram of one embodiment of the present system.

FIG. 7 is a block diagram of one embodiment of the present system. The description below provides exemplary software programs applications, programming languages, and interface that may be assembled to implement the itinerary planner described above. However, one of skill in the art would understand that this is merely an exemplary implementation, and each of these components could be replaced.

The agent 710 includes a GeoRouter and WingfootSOAP. GeoRouter is a software component that provides a full set of tools to solve most transportation routing problems. The Wingfoot SOAP is a lightweight client implementation of SOAP (simple object protocol, an XML protocol) that is specifically targeted at the MIDP/CLDC platform. However, it can be used in J2SE and J2EE environments.

The Database 720, in one embodiment, includes mapping information. In one embodiment, the database 720 is a mySQL database. In one embodiment, the database 720 includes image files. The image files may be used for pictures of the various locations. The image files may be used to display images, photographs, videos, or maps of the locations to visit. This can be used in addition to the textual information displayed about the locations.

The application server 730 includes TomCat and a Web Application Server. Tomcat is the servlet container that is used in the official Reference Implementation for the Java Servlet and JavaServer Pages technologies.

The MDP Solver 740 includes a SPUDD, CUDD, and gSOAP. SPUDD is Stochastic Planning using Decision Diagrams, and it is one method of solving the equations used in planning. CUDD is CU Decision Diagrams, which is a package that provides functions to manipulate Binary Decision Diagrams (BDDs), Algebraic Decision Diagrams (ADDs), and Zero-suppressed Binary Decision Diagrams (ZDDs). The package provides a large set of operations on BDDs, ADDs, and ZDDs, functions to convert BDDs into ADDs or ZDDs and vice versa, and a large assortment of variable reordering methods. The gSOAP compiler tools provide a unique SOAP/XML-to-C/C++ language binding to ease the development of SOAP/XML Web services and client application in C and/or C++.

Mapinfo 750 includes routing server, mapping server, and a GeoCoder. The GeoCoder is a software application that assigns geographic coordinates to a record. Mapping server generates maps for locations identified by the GeoCoder, while Routing Server can be used to generate routes between identified locations.

C-HTN Planner 760 includes SHOP2 and CL-HTTP Server. SHOP2 is Simple Hierarchical Ordered Planner (version2). CL-HTTP Server is a Common Lisp Hypermedia Server (CL-HTTP).

The Business Process Execution Language for Web Service (BPEL4WS) 770 enables a service composer to aggregate one or more web services into a (possibly non-deterministic) execution of one or more web services.

Figure 8:
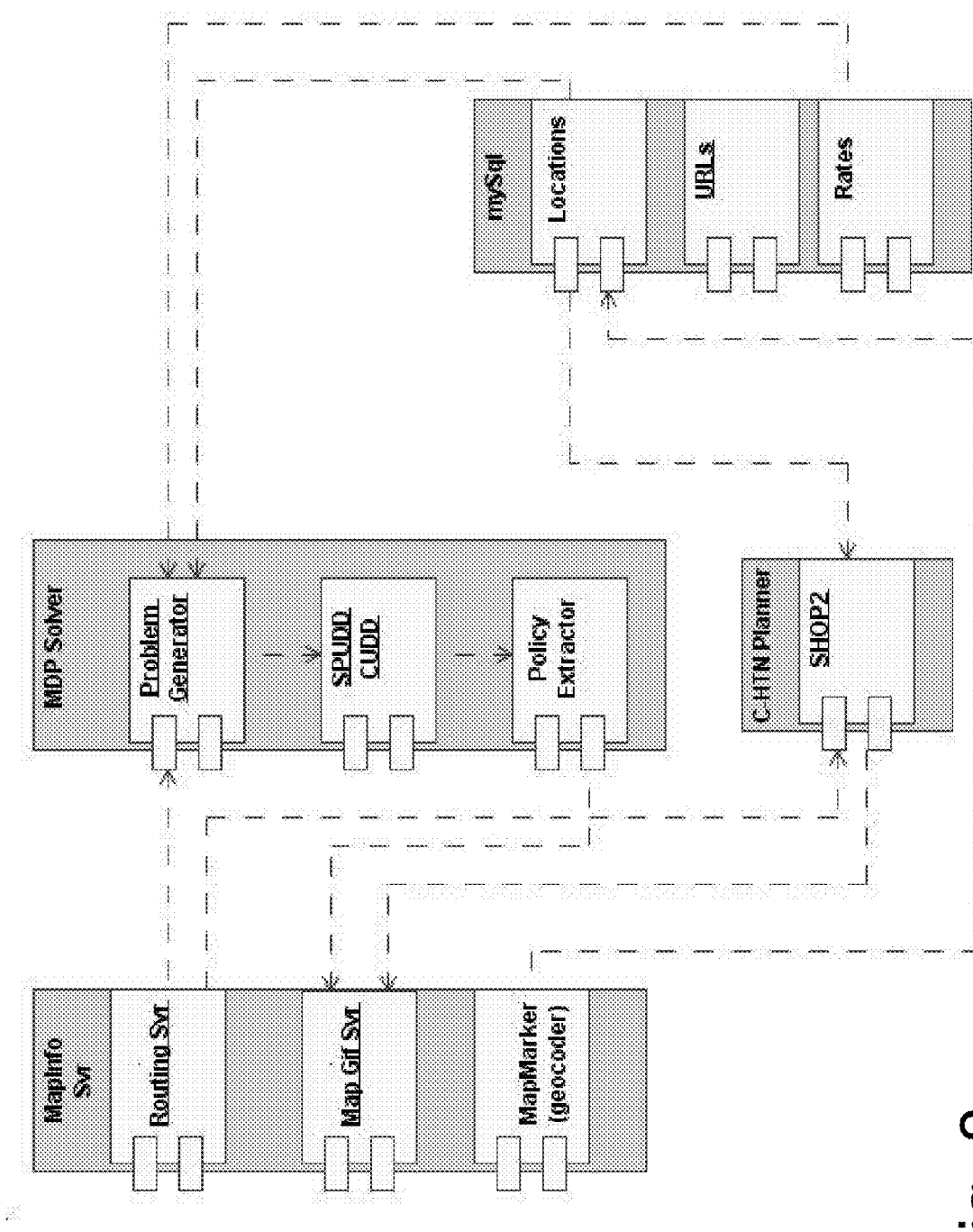
FIG. 8 is a block diagram showing the interconnections between the elements of FIG. 7.

FIG. 8 is a block diagram showing the interconnections between the elements of FIG. 7.

Figure 9:
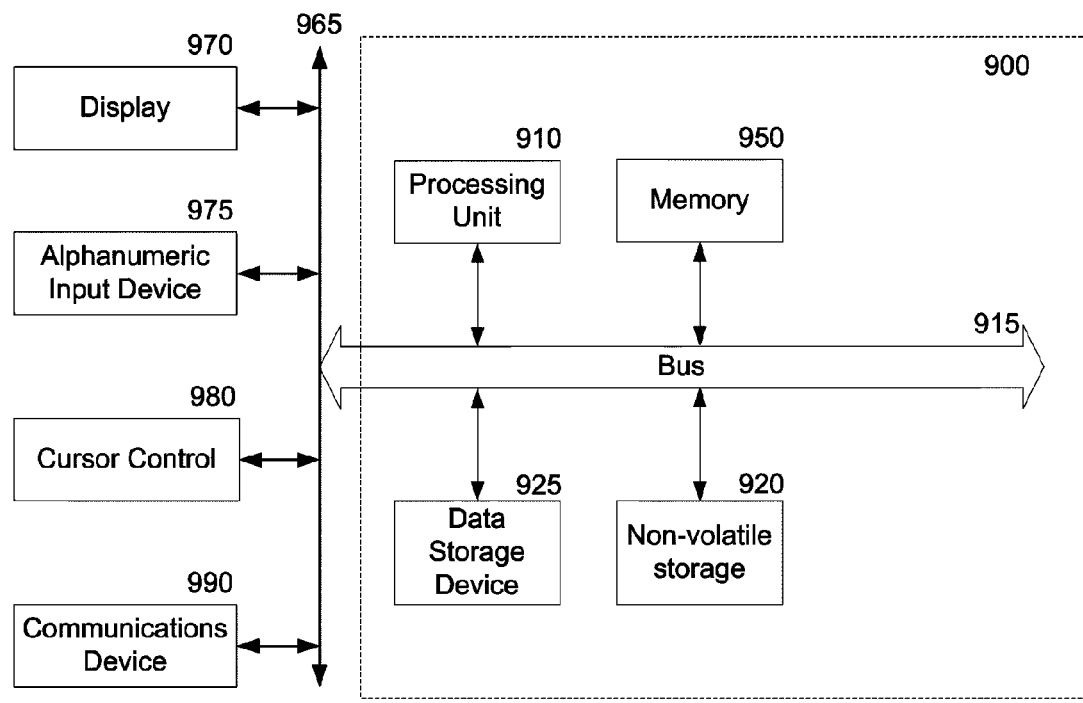
FIG. 9 is a block diagram of a computer system on which the present invention may be implemented.

FIG. 9 is one embodiment of a computer system that may be used with the present invention. It will be apparent to those of ordinary skill in the art, however that other alternative systems of various system architectures may also be used.

The data processing system illustrated in FIG. 9 includes a bus or other internal communication means 915 for communicating information, and a processor 910 coupled to the bus 915 for processing information. The system further comprises a random access memory (RAM) or other volatile storage device 950 (referred to as memory), coupled to bus 915 for storing information and instructions to be executed by processor 910. Main memory 950 also may be used for storing temporary variables or other intermediate information during execution of instructions by processor 910. The system also comprises a read only memory (ROM) and/or static storage device 920 coupled to bus 915 for storing static information and instructions for processor 910, and a data storage device 925 such as a magnetic disk or optical disk and its corresponding disk drive. Data storage device 925 is coupled to bus 915 for storing information and instructions.

The system may further be coupled to a display device 970, such as a cathode ray tube (CRT) or a liquid crystal display (LCD) coupled to bus 915 through bus 965 for displaying information to a computer user. An alphanumeric input device 975, including alphanumeric and other keys, may also be coupled to bus 915 through bus 965 for communicating information and command selections to processor 910. An additional user input device is cursor control device 980, such as a mouse, a trackball, stylus, or cursor direction keys coupled to bus 915 through bus 965 for communicating direction information and command selections to processor 910, and for controlling cursor movement on display device 970.

Another device, which may optionally be coupled to computer system 900, is a communication device 990 for accessing other nodes of a distributed system via a network. The communication device 990 may include any of a number of commercially available networking peripheral devices such as those used for coupling to an Ethernet, token ring, Internet, or wide area network. The communication device 990 may further be a null-modem connection, a wireless connection mechanism, or any other mechanism that provides connectivity between the computer system 900 and the outside world. Note that any or all of the components of this system illustrated in FIG. 9 and associated hardware may be used in various embodiments of the present invention.

It will be appreciated by those of ordinary skill in the art that any configuration of the system may be used for various purposes according to the particular implementation. The control logic or software implementing the present invention can be stored in main memory 950, mass storage device 925, or other storage medium locally or remotely accessible to processor 910.

It will be apparent to those of ordinary skill in the art that the system, method, and process described herein can be implemented as software stored in main memory 950 or read only memory 920 and executed by processor 910. This control logic or software may also be resident on an article of manufacture comprising a computer readable medium having computer readable program code embodied therein and being readable by the mass storage device 925 and for causing the processor 910 to operate in accordance with the methods and teachings herein.

The present invention may also be embodied in a handheld or portable device containing a subset of the computer hardware components described above. For example, the handheld device may be configured to contain only the bus 915, the processor 910, and memory 950 and/or 925. The present invention may also be embodied in a special purpose appliance including a subset of the computer hardware components described above. For example, the appliance may include a processor 910, a data storage device 925, a bus 915, and memory 950, and only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism.

It will be appreciated by those of ordinary skill in the art that any configuration of the system may be used for various purposes according to the particular implementation. The control logic or software implementing the present invention can be stored on any machine-readable medium locally or remotely accessible to processor 910. A machine-readable medium includes any mechanism for storing or transmitting information in a form readable by a machine (e.g. a computer). For example, a machine readable medium includes read-only memory (ROM), random access memory (RAM), magnetic disk storage media, optical storage media, flash memory devices, electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method to create an itinerary comprising:
   receiving, by a server computing system, user preferences for a plan utility;
   selecting a plan element having a positive utility above a threshold value;
   creating, by the server computing system, a personalized plan based on the selected plan elements, wherein the personalized plan defines at least one decision point to detect during execution of the personalized plan whether a user is following an original plan element that is associated with the decision point, and wherein the at least one decision point is defined prior to execution of the personalized plan and has an associated original plan element and at least one associated alternative plan element that are pre-determined prior to execution of the personalized plan.

2. The method of claim 1, further comprising:
   determining if there is additional time remaining for more plan elements; and
   if there is additional time remaining, selecting an additional plan element.

3. The method of claim 1, wherein plan elements are selected based on the utility and a relative location of the plan element.

4. The method of claim 1, wherein receiving a user preference comprises receiving: a starting time, a starting location, an available time.

5. An apparatus to create an itinerary comprising:
   a memory to store a plurality of possible plan elements, each element having one or more categories associated with the element;
   a processor coupled to the memory; and
   a plan utility evaluation logic executed from the memory by the processor to select a plan element for a personalized plan, the plan element having a utility, the utility being a match between the categories associated with the plan element and user preferences, and
   a plan creation logic executed from the memory by the processor to generate a plan using the plan element by identifying a plan element having a utility above a set utility threshold, wherein the plan defines at least one decision point to detect during execution of the plan whether a user is following an original plan element that is associated with the decision point, and wherein the at least one decision point is defined prior to execution of the plan and has an associated original plan element and at least one associated alternative plan element that are pre-determined prior to execution of the plan.

6. The apparatus of claim 5, further comprising:
   a user interface to receive plan acceptance and plan rejections from the user;
   upon indication by the user that the plan is rejected, the plan creation logic further to select a second plan having a utility a predefined delta above the utility of the first plan; and
   selecting the second plan.

7. The apparatus of claim 6, wherein the plan creation logic further iterates the process until no plans with a higher utility are present.

8. The apparatus of claim 5, further comprising:
   an acquisition engine executed from the memory by the processor to acquire plan elements, the acquisition engine to acquire plan elements and categorize the plan elements.

9. The apparatus of claim 8, wherein categorizing the plan elements comprises identifying which one or more categories the plan element satisfies, the categories corresponding to the selectable user preferences.

10. An apparatus to generate an itinerary comprising:
    a first means to receive a plurality of user preferences;
    a generation means to generate a plan using plan elements, wherein the plan elements have a utility above a threshold value;
    an evaluation means to identify a utility of the plan, the utility being a match between the categories associated with the plan elements in the plan and the user preferences; and
    a selection means to select a personalized plan from the plurality of plans, wherein the selected plan defines at least one decision point to detect during execution of the selected plan whether a user is following an original plan element that is associated with the decision point, and wherein the at least one decision point is defined prior to execution of the selected plan and has an associated original plan element and at least one associated alternative plan element that are pre-determined prior to execution of the selected plan.

11. The apparatus of claim 10, wherein the plan elements comprise travel destinations available to the user, to construct a travel itinerary.

12. The apparatus of claim 10, wherein the plan elements comprise virtual locations defined by Universal Resource Indicators (URIs) to construct a web services itinerary.

13. The apparatus of claim 10, further comprising:
    an acquisition means to acquire plan elements; and
    a categorization means to assign categories to the plan elements, the categories corresponding to categories selected by a user as user preferences.

14. A non-transitory machine readable medium having stored thereon data representing sequences of instructions, which when executed by a computer system, cause said computer system to create an itinerary, by performing the steps of:
    identifying a plurality of user preferences;
    selecting one or more plan elements having a positive utility above a threshold value; and
    constructing a personalized plan including the one or more plan elements, the personalized plan having the highest available utility and defining at least one decision point to detect during execution of the personalized plan whether a user is following an original plan element that is associated with the decision point, and wherein the at least one decision point is defined prior to execution of the personalized plan and has an associated original plan element and at least one associated alternative plan element that are pre-determined prior to execution of the personalized plan.

15. The non-transitory machine readable medium of claim 14, further having stored thereon data representing sequences of instructions, which when executed by a computer system, cause the computer to perform the steps of:
    identifying a first plan having a utility above a set utility threshold;

presenting the first plan to a user;
upon indication by the user that the first plan is rejected, identifying a second plan having a utility a predefined delta above the utility of the first plan; and
presenting the second plan to the user.

16. The non-transitory machine readable medium of claim 14, further having stored thereon data representing sequences of instructions, which when executed by a computer system, cause the computer to generate a plurality of plans, causing the computer to perform the steps of:
identifying a starting location;
connecting together a plurality of plan segments, the plurality of segments fitting within an allotted time period.

17. A method of creating a plan comprising:
retrieving a plurality of possible plan elements, each element having one or more categories associated with the element;
receiving a category value for each category associated with each element;
automatically generating a first complete plan using the plan elements and the category values for each category;
determining, by a server computing system, whether to generate a new complete plan and based on the determination that a new plan should be generated, automatically generating the new complete plan,
wherein the new complete plan defines at least one decision point to detect during execution of the new complete plan whether a user is following an original plan element that is associated with the decision point, and wherein the at least one decision point is defined prior to execution of the new complete plan and has an associated original plan element and at least one associated alternative plan element that are predetermined prior to execution of the new complete plan; and
determining, by the server computing system, whether to select the new complete plan as a final complete plan.

18. The method of claim 17, wherein automatically generating a first complete plan comprises:
calculating a user value for each element using the category values;
selecting the element having the highest user value as part of the first complete plan;
determining whether to select another element to add to the first complete plan;
re-calculating a user value for each element based on the selected element;
selecting the element having the highest user value; and
calculating a user value for the first complete plan using each of the user values of the selected elements.

19. The method of claim 18, wherein determining whether to select another element to add to the first complete plan is based on time available in the first complete plan.

20. The method of claim 17, wherein determining whether to generate a new complete plan comprises:
determining whether to select the first complete plan as the final complete plan; and
generating the new complete plan when the first complete plan is not selected as the final complete plan.

21. The method of claim 17, wherein automatically generating the new complete plan comprises identifying a new complete plan having a utility at least a delta above a utility of the first complete plan.

22. The method of claim 17, wherein determining whether to select the new complete plan as a final complete plan comprises:
determining whether a user request to identify a complete plan having a utility of at least a delta above the utility of the new complete plan is received; and
selecting the new complete plan as the final complete plan when a user request is not received.

23. The method of claim 17, wherein the category value for each category is based on one or more of: a user input and a history of user behavior.

24. A method of creating a plan comprising:
retrieving a plurality of possible plan elements, each element having one or more categories associated with the element;
receiving a plurality of user preferences, wherein the user preferences include a user value for each category;
receiving a minimum utility for a final complete plan, wherein the minimum utility is a predefined value, the minimum utility being the minimum user value for the final complete plan based on the plan elements and user values for each category;
automatically constructing, by a server computing system, a first complete plan having at least the minimum utility;
identifying, by the server computing system, a new complete plan having a utility at least a delta above the utility of the first complete plan, wherein the new complete plan defines at least one decision point to detect during execution of the new complete plan whether a user is following an original plan element that is associated with the decision point, and wherein the at least one decision point is defined prior to execution of the new complete plan and has an associated original plan element and at least one associated alternative plan element that are pre-determined prior to execution of the new complete plan; and
determining, by the server computing system, whether to select the new complete plan as the final complete plan.

25. The method of claim 24, wherein determining whether to identify a new complete plan comprises:
determining whether to select the first complete plan as the final complete plan; and
identifying the new complete plan when the first complete plan is not selected as the final complete plan.

26. The method of claim 24, wherein determining whether to select the new complete plan as the final complete plan comprises:
determining whether a user request to identify a complete plan having a utility of at least a delta above the new complete plan is received; and
selecting the new complete plan as the final complete plan when a user request is not received.

27. A computer-implemented method of creating a plan on a planning server computing system, the method comprising:
receiving a plurality of user preferences through an interface;
retrieving a plurality of possible plan elements from a memory, each element having one or more categories associated with the element;
determining, by the planning server computing system, at least one of the plurality of plan elements is a multi-step activity; separating the at least one plan element that is a multi-step activity into sub-elements, wherein the sub-elements include a constraint defining a relationship between the sub-elements;
automatically generating, by the planning server computing system, a plurality of complete plans by a processor, wherein each complete plan is generated based on the at least one constraint defining the relationship between the sub-elements; and selecting, by the planning server computing system, a personalized plan from the plurality of complete plans by the processor, the personalized plan having a utility, the utility being a match between the categories associated with the plan elements and the user preferences, wherein the personalized plan defines at least one decision point to detect during execution of the new complete plan whether a user is following an original plan element that is associated with the decision point, and wherein the at least one decision point is defined prior to execution of the personalized plan and has an associated original plan element and at least one associated alternative plan element that are pre-determined prior to execution of the personalized plan.

28. The computer-implemented method of claim 27, wherein the constraint is a dependency of one of the sub-elements on another sub-element.

29. The computer-implemented method of claim 27, wherein the constraint is a temporal constraint.

* * * * *